(12) United States Patent
Panosian et al.

(10) Patent No.: US 11,257,257 B1
(45) Date of Patent: Feb. 22, 2022

(54) MULTI-MODE OBSCURED OBJECT DETECTOR

(71) Applicants: Michael H. Panosian, Irvine, CA (US); Joshua M. Keeler, Irvine, CA (US)

(72) Inventors: Michael H. Panosian, Irvine, CA (US); Joshua M. Keeler, Irvine, CA (US)

(*) Notice: Subject to any disclaimer, the term of this patent is extended or adjusted under 35 U.S.C. 154(b) by 0 days.

(21) Appl. No.: 17/200,780

(22) Filed: Mar. 13, 2021

(51) Int. Cl.
*G06T 11/00* (2006.01)
*G01V 3/08* (2006.01)
*G06K 9/46* (2006.01)

(52) U.S. Cl.
CPC ............... *G06T 11/00* (2013.01); *G01V 3/08* (2013.01); *G06K 9/4604* (2013.01)

(58) Field of Classification Search
CPC ......... G06T 11/00; G06K 9/4604; G01V 3/08
See application file for complete search history.

(56) References Cited

U.S. PATENT DOCUMENTS

| | | | | |
|---|---|---|---|---|
| 6,020,264 | A * | 2/2000 | Lustig | B24B 37/013 438/692 |
| 6,215,293 | B1 * | 4/2001 | Yim | G01V 3/15 324/326 |
| 2009/0230945 | A1 * | 9/2009 | Smoot | G01V 3/088 324/67 |
| 2011/0215819 | A1 * | 9/2011 | Dorrough | G01V 3/08 324/684 |
| 2011/0243476 | A1 * | 10/2011 | Sieracki | G01V 3/15 382/291 |

FOREIGN PATENT DOCUMENTS

CN 109732405 A * 5/2019

OTHER PUBLICATIONS

PERLESMITH Stud Finder Wall Detector 5 in 1, Amazon webpage. https://www.amazon.com/PERLESMITH-Stud-Finder-Wall-Detector/dp/B07VLDTVFQ (Product first available: Jul. 24, 2019) (Year: 2019).*
PSESF01—PERLESMITH Stud Finder Instruction Manual—1.0 (Jul. 25, 2019) (Year: 2019).*
Machine translation of CN109732405A (Year: 2019).*

(Continued)

*Primary Examiner* — Sing-Wai Wu
(74) *Attorney, Agent, or Firm* — Arjomand Law Group; Farjam Majd

(57) ABSTRACT a device and a method are disclosed to detect obstructed objects, usually behind a wall or other similar surface. The device may be used by dragging it across the surface of the wall to scan, detect and display the objects behind the wall. The types of hidden objects and materials they are made of vary and may include wooden or metal studs used in building construction, electrical AC or DC wires and conduits, metal rebar and the like. Each type of material may need a different type of sensor to be detected. In some examples, the device may include memory to record the objects detected and display them on the screen in a persistent manner. The objects may be displayed via graphics that are similar to the real objects that were detected. In effect, the device may display a picture of what is hidden behind the wall.

20 Claims, 12 Drawing Sheets

(56) References Cited

OTHER PUBLICATIONS

Blake Sutton, "How Does a Non Contact Voltage Tester Work?" Jan. 2, 2021. https://www.electricalknowledge.com/electricians-tools/how-does-a-non-contact-voltage-tester-work/ (Year: 2021).*

Graziella Bedenik, Jefferson Silveira, Italo Santos, Elyson Carvalho, Jose Gilmar Carvalho and Raimundo Freire, "Single Coil Metal Detector and Classifier Based on Phase Measurement," 2019 4th International Symposium on Instrumentation Systems, Circuits and Transducers (INSCIT) (Year: 2019).*

\* cited by examiner

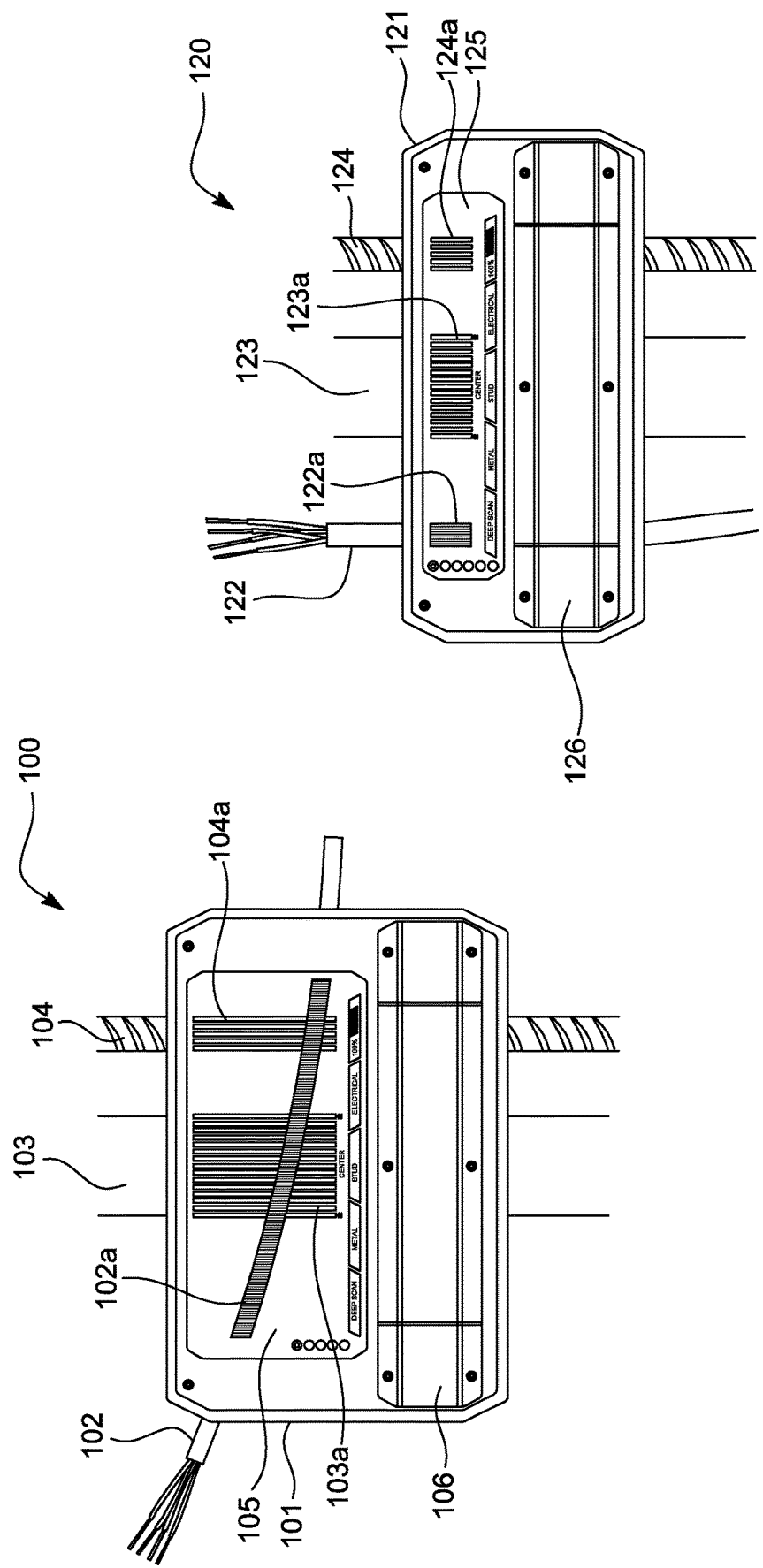

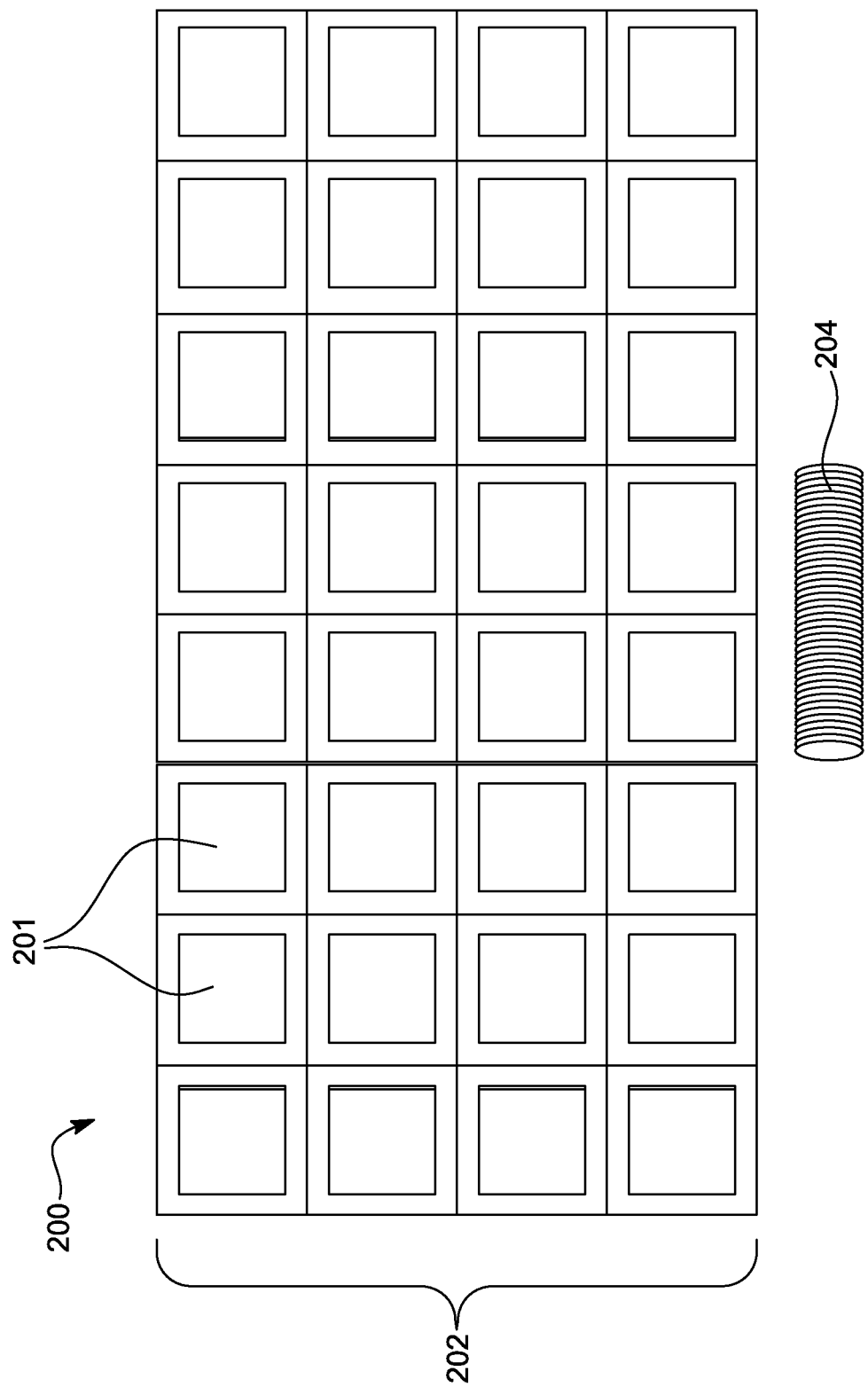

MULTI-MODE OBSCURED OBJECT DETECTOR

CROSS-REFERENCE(S) TO RELATED APPLICATION(S)

None.

TECHNICAL FIELD

This application relates generally to measurement and detection devices. More specifically, this application relates to a multi-mode hidden object detector for detecting objects behind a surface like a wall.

BRIEF DESCRIPTION OF THE DRAWINGS

The drawings, when considered in connection with the following description, are presented for the purpose of facilitating an understanding of the subject matter sought to be protected.

FIG. 1A shows an example multi-mode obscured object detector (MMOOD) detecting several object types behind a wall;

FIG. 1B shows another example MMOOD with a smaller screen detecting several object types behind a wall;

FIG. 2 shows an example layout of multiple sensors of the MMOOD of FIG. 1A;

DETAILED DESCRIPTION

Figure 1C:
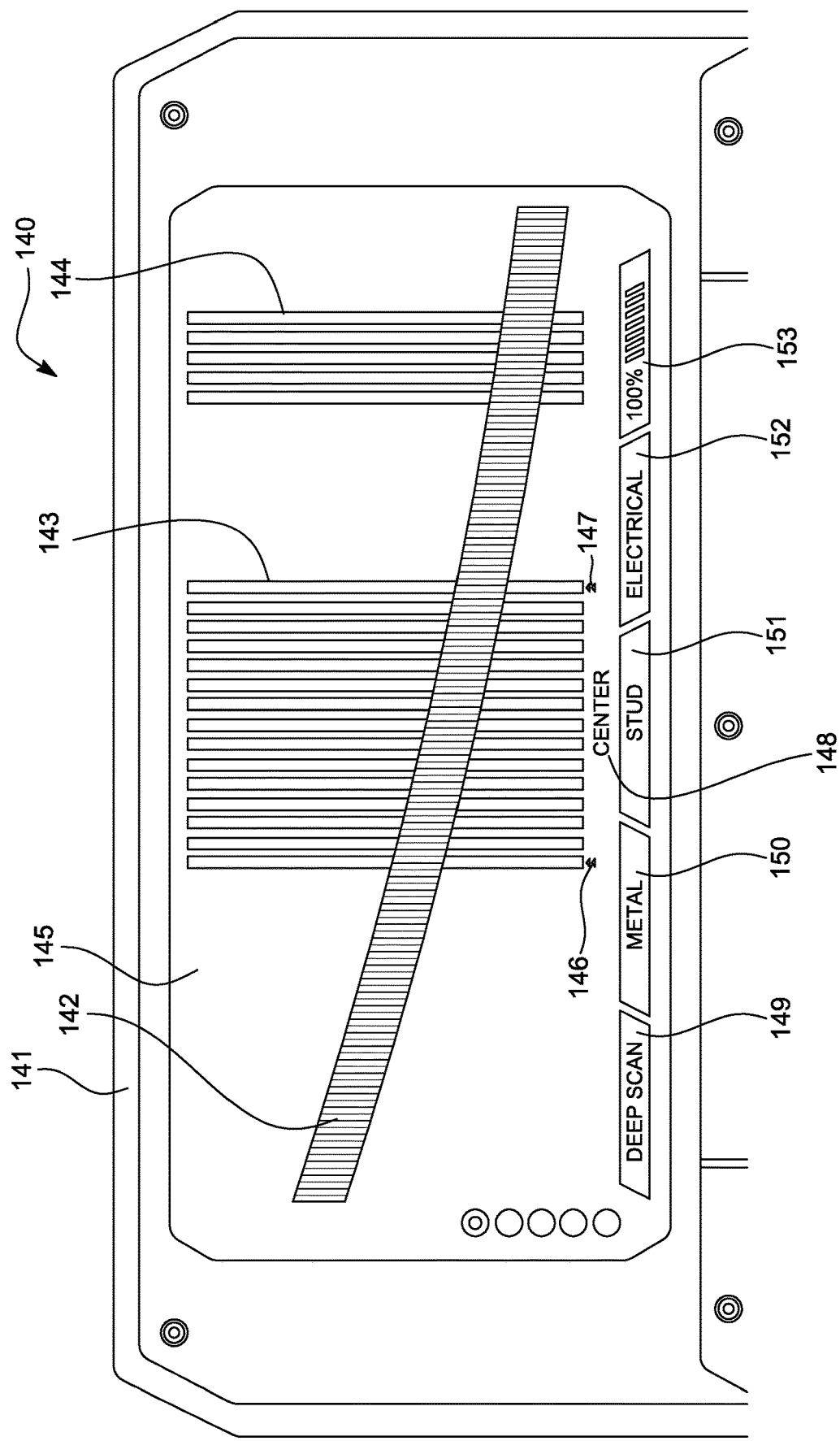
FIG. 1C shows a closeup view of a user interface of the example MMOOD of FIG. 1A.

While the present disclosure is described with reference to several illustrative embodiments and example devices described herein, it should be clear that the present disclosure should not be limited to such embodiments. Therefore, the description of the embodiments provided herein is illustrative of the present disclosure and should not limit the scope of the disclosure as claimed. In addition, while following description references particular MMOOD screens it will be appreciated that the disclosure may be used with other types of MMOOD screens and configurations.

Briefly described, a system and a method are disclosed including a MMOOD electronic device to detect and/or measure obstructed objects, usually behind a wall or other similar surface. The MMOOD may be used by dragging it across the surface of the wall to scan, detect and display the objects behind the wall. The types of hidden objects and materials they are made of vary and may include wooden or metal studs used in building construction, electrical AC or DC (Direct Current) wires and conduits, metal rebar and the like. These objects may stretch horizontally, vertically, diagonally or in any random direction behind a wall. Each type of material may need a different type of sensor to be detected. For example, wooden studs may be detected via capacitive sensors, live (with current flowing) electrical wires may be detected via using an antenna, and metal objects may be detected using a coil sensor, as further described below with reference to the figures. In some examples, the MMOOD may include memory to register or record the objects detected and display them on the screen in a persistent (may be volatile or non-volatile) manner. The objects may be displayed via graphics that are similar to the real objects that were detected. In effect, the MMOOD may display a picture of what is hidden behind the wall even after the scanning is completed and the MMOOD is removed from the wall surface.

In various embodiments, a multi-mode obscured object detection (MMOOD) system for detecting objects hidden behind a surface is disclosed. The system includes an electronic device with a digital screen, a number of sensors and sensor circuits to detect different types of objects and materials, a scan actuator to start scanning a target surface having hidden objects behind it, and generating image data corresponding to the hidden objects. A controller unit may receive the generated image data and render images of the hidden objects, including material type and hidden object contours, on the digital screen.

In various embodiments, a hidden object detector is disclosed including a digital screen, a number of sensors including an array of capacitive sensors, an AC wire sensor, and a metal detector, and a scan actuator usable to scan a target surface with hidden objects behind it, to detect the hidden objects by collecting scan data. A controller unit to receive scan data and convert the scan data to image data to display on the digital screen.

In various embodiments, a method of detecting obscured objects including activating a scan function on a MMOOD device to start scanning a target surface for hidden objects, scanning the target surface to collect scan data using a number of sensor types, conditioning the scan data using a number of circuits, each circuit associated with a particular type of sensor, and transmitting the conditioned scan data to a controller unit. The controller unit may process the conditioned scan data to convert them to image data and display the image data on a digital screen.

Building contractors, construction crews, and private do-it-yourself (DIY) people generally have to find out what objects may be behind a wall or building surface before they can drill, saw, install a heavy object using nails or screws, such as a mirror, and the like. The existing hidden object detectors, often called stud-finders, are often helpful but have drawbacks. Most stud-finders detect only one type of object, usually wooden beams or studs. Also, they do not show the boundaries of objects, such as beams, effectively because the display often includes a series of LEDs (Light Emitting Diode) that turn ON and OFF up as the stud-finder is dragged across the wall. This way it is difficult for the user to mark the boundaries and the center of the object precisely. Hence, the user may have to repeat the detection process several times to ensure proper detection of the object's location. Sometimes, the user may have to physically verify the location of the object, for example, by drilling a small hole to see if it touches the hidden object.

This can be a time-consuming and inaccurate process. Therefore, there is a need for a hidden object detection device that provides a high-resolution, reliable, and complete picture of the hidden objects behind a wall to reduce project time, increase project accuracy, reduce costs and increase overall efficiency and quality.

FIG. 1A shows an example MMOOD detecting several object types behind a wall. In various embodiments, the object detection environment 100 may include a MMOOD 101 to detect hidden wire 102, wooden beam or stud 103, and metal rebar 104 and display them as image of a wire 102a, image of a wooden stud 103a, and image of a metal rebar 104a, respectively on MMOOD screen 105. MMOOD 101 may further include a user input panel 106 that may include various hardware buttons or other types of actuators for power, mode selection, scanning, and the like.

In various embodiments, the images 102a-104a of the hidden objects may be displayed with high-resolution graphics that are visually similar to the objects. For example, the wooden stud 103 may be depicted as a beam with wood print and in wood color. In other embodiments, that have a lower cost, the images may be displayed by symbolic patterns that are assigned to each type of object. For example, the wooden stud 103 may be displayed as a strip with a slanted line pattern and the metal rebar 104 may be displayed as a narrower strip with a dot-pattern on it.

In various embodiments, the screen 105 may be touch-sensitive to allow user input without an input device such as a mouse, a pen, or multiple buttons and knobs. In other embodiments, the screen display may be controlled by hardware buttons on the input panel 106. In some embodiments, the screen 105 is a digital display that is used under program control for display of digital data, including graphics. Those skilled in the art appreciate that digital displays have pixels (picture elements) that are individually addressable in a 2-D (two dimensional) grid of pixels, usually by specifying a row and column of the 2-D grid, and are thus controllable by software or digital hardware, such as graphic programs or chips, respectively.

In various embodiments the MMOOD 101 may include memory and/or storage units or modules to save images scanned from behind the wall to display or review later after the scan is complete. Data saved in a memory module are volatile and will be destroyed if power is removed from the MMOOD 101, while data saved in a storage module is non-volatile and stay saved until erased or overwritten by the user. The saved images provided added functionality and advantage that the user is not restricted as to when to identify the location of the objects. The user may identify the locations in real-time during scanning or leave it for later when more time is available. Saved images may also be reviewed more carefully to ascertain their validity and accuracy.

In various embodiments, the MMOOD 101 may record an initial scan point or reference point based on its distance from a wall or a corner or some known mark. All scans after the reference point are recorded with respect to the reference point and is called a scan session. The scan session may continue until the next reference point is recorded, starting another scan session. A scan session is generally one continuous scan from the reference point to some desired end-point for scanning. The images recorded during a scan session are saved in memory or storage and may be played back for review. In some embodiments, the recorded images may be uploaded to a computer or an external storage, such as a cloud (remote networked) storage, for project documentation or for communications to others.

In various embodiments, the MMOOD 101 may be placed in various scan modes. In some embodiments the scan modes may be selected by the user using a scan actuator such as a hardware button, a software button, or other types of actuators, while in other embodiments, some of the scan modes may be enabled by default. Still in other embodiments, the scan modes may activated automatically by a proximity detector. In still other embodiments, a preselected set of scan modes may be simultaneously activated upon power up of the MMOOD 101. The scan modes may include single-scan, in which a single image is captured and saved. Another scan mode may include a persistent mode in which images are saved in memory or storage. Another scan mode may be a continuous-scan, in which a reference point is recorded and scan session is started. These scan modes are based on memory and/or storage recording of images. Another scan mode may be non-memory scan mode, in which the MMOOD works like existing stud-finders and no images are recorded. This way, each scan is reviewed during operation and will disappear afterwards. The non-memory scan mode may be useful for quick scans or preliminary scans.

In other embodiments, the MMOOD 101 may be placed in a scan mode by default in which all sensor types are enabled and scan for all types of objects and material simultaneously. In such modes, any object that is behind the wall is detected and displayed and the objects that are not detected are not displayed.

Other scan modes may be based on the type of material or object the user is interested in. For example, a user may only want to find wooden studs to hang a picture or a mirror and is not interested in finding metal objects. In such a case, the user may place the MMOOD in a wooden object scan mode. In this mode, the MMOOD 101 only activates and uses capacitive sensors to detect wooden objects. Similarly, for AC wire or metal objects, the user may place the MMOOD in AC wire scan mode or metal object scan mode. In each such material-based scan mode, the MMOOD may only activate and use the appropriate sensors to detect the corresponding object types.

Still another scan mode may include detection of moving objects. In most cases, the moving object may be a live animal such as a mouse or rat moving behind the wall. This scan mode may be useful for exterminators or pest control personnel. The moving object scan mode may use the capacitive sensors to detect differences in moving objects and their backgrounds.

In various embodiments, combinations of scan modes may be used to combine various functions such as memory, scan session, and moving objects to realize the goals of a particular scan.

In some embodiments, the scan mode may be set to deep-scan. Deep-scan mode may be used to account for the thickness of the front cover of the wall, for example, sheetrock. For example, for a half-inch sheetrock deep-scan mode may not be necessary, while for a one-inch sheetrock deep-scan mode may be used to differentiate the thick sheetrock from any objects behind it, such as a wooden stud.

Those skilled in the art will appreciate that other modes of operation may be defined without departing from the spirit of this disclosure. For example, an auto-scan mode may be selected in which the MMOOD device automatically selects a suitable scan mode based on scan history, types of objects detected, and the like.

In various embodiments, the user input panel 106 may include several buttons, knobs, or other hardware input devices to allow the user to control some aspects of the operation of the MMOOD. For example, one such button may be a power button to turn the MMOOD ON or OFF. Another one or more buttons may be for scan mode selection that may cycle through various scan modes in sequence or in a particular combination. Another button or actuator may be to enable scanning. In some embodiments, a proximity detector may or any of the object sensors may enable scanning automatically upon detection of an object or by being close to the wall being scanned. In some embodiments, the user input panel 106 may be supplemented by touch-sensitive soft buttons on the screen 105. The user may use these soft buttons for other controls.

With continued reference to FIG. 1A, in various embodiments, various command and/or status hard and soft buttons may be provided. For example, for powering on the MMOOD device the user may hold a power button. When the user releases the power button the device will turn OFF. 2.

Other buttons may be used for various scanning modes. For example, a button may be used to place the device in a stud scanning mode in which capacitive sensors may be used to find various hidden objects such as wooden studs for display on the LCD screen 105. In this mode, the AC sensors may be used simultaneously for safety and AC warning to the user.

Another mode button may be employed to place the MMOOD device in a AC wire scan mode using AC sensor, as later described with respect to FIGS. 2 and 3. The AC sensor may find an AC wire but it cannot find its contours. As in other scan modes, to visualize an AC wire in a photo-similar manner, the boundaries of the AC wire may be detected using capacitive sensors, as further described below.

Another button may be used to place the MMOOD device in a metal scan mode using a metal detection sensor, as later described with respect to FIGS. 2 and 3. In this mode, the metal detector sensor and circuits are enabled. The metal detector identifies that there is a metallic object without identifying the type of metal. As in other scan modes described above, the AC sensor may also be used at the same time to ensure user's safety and warn against live AC wire. And for visualization, as in other scan modes, capacitive sensor array may be used to determine the contours of the object, while the metal detector identifies that the object shown on screen is made of metal. So, a combination of the metal detector and capacitive sensors allow the determination of the shape and contours of a metallic object.

Another mode of operation is to not provide options for the user to change the scan modes. In this mode, the device turned ON/OFF and during the scan all sensor types and relevant circuits work together. The combination of sensors allow the determination of shape, material type, and relative positions of the hidden objects for display on the screen.

In some embodiments, the scan function of the MMOOD may be activated by using a button or a similar mechanical or touch-sensitive actuator on the MMOOD. To scan a wall section, the user may depress or activate the scan actuator and scan a desired section of the wall while keeping the scan actuator active. The user may release the scan actuator after the scan is completed. In other embodiments, the scan actuator may be a toggle switch that when touched once the scan function is activated or started and remains active until the toggle switch is touched again to stop the scan function. In some embodiments, the scanning function may be started by a proximity sensor or any of the object sensors (for example, stud sensor, AC wire sensor, or metal sensor) when they detect the wall or an object behind the wall. This way the user may only turn on the MMOOD and start moving it across a wall to automatically scan for all types of objects.

Most measurement devices, be they mechanical, optical, electrical or have any other basis for measurement, need to be calibrated at least once, but more often periodically. Calibration is the process of assigning a predetermined value to each mark on a measurement scale of a device. Alternatively, calibration can be the process of defining new marks corresponding to predetermined values. For example, to calibrate a spring-scale, known weights (predetermined values) may be hung from the spring (for example, using a hook) and see how far the spring stretches. Then the limit of the stretch under the weight is marked with the value of that weight. So, if the weight is one pound (1 lb.), then the stretch limit is marked as a "1 lb." Next, a 2-lb. weight may be hung and the process repeated until the capacity of the spring is reached. After this process, the spring scale is said to have been calibrated, meaning that each mark now represents an accurate weight measurement.

The same calibration process may be performed for sensors in the MMOOD device to distinguish between sensor signals resulting from a hidden object and general background like air or sheetrock. For example, a sensor signal level that is due to air will have a different value than a signal resulting from a wooden stud near the sensor. In various embodiments, the MMOOD sensors may be auto-calibrated. This process includes placing the MMOOD device in a first stage of an auto-calibration mode, and then placing it on a section of a wall, which is known to have no hidden objects behind it. The device is then used to scan the target section. At this point the sensors' signal levels are saved and are considered to have resulted from and calibrated for a wall section with no hidden object. Then the auto-calibration mode may be set to a second stage and the MMOOD may be placed on another section of the wall that is known to have a hidden object behind it. The MMOOD device is used to scan the other section of the wall having objects behind it. Now, the sensors' signal levels are saved and considered to have been resulted from and calibrated for hidden objects. This process outline is a simplified version to make it easier and clearer to describe. In a real calibration process, each type of sensor and type of object may be calibrated separately for better accuracy, using a similar process. A calibration wall mock-up section (fake wall), a few square feet in area, may be used for calibration purposes so the user knows precisely what is behind the wall and where.

In various embodiments, the detection process may include two stages: in stage one, the scanning device (MMOOD) detects that there is some object behind the wall. In stage two, the scanning device identifies the type of material.

FIG. 1B shows another example MMOOD with a smaller screen detecting several object types behind a wall. In various embodiments, the object detection environment 120 may include a compact MMOOD 121 (compared with MMOOD 101) to detect hidden wire 122, wooden beam or stud 123, and metal rebar 124 and display them as image of a wire 122a, image of a wooden stud 123a, and image of a metal rebar 124a, respectively on compact MMOOD 121 screen 125. The compact MMOOD 121 may further include a user input panel 126 that may include various hardware buttons for power, mode selection, and the like.

In various embodiments, other aspects the compact MMOOD 121 may be substantially similar or identical with MMOOD 101. For example, various functions, scan modes, memory, storage, scan activation and the like may be the same as described above with respect to FIG. 1A.

In other embodiments, the compact MMOOD 121 may lack some of the functionalities of MMOOD 101 to reduce cost, size, and complexity.

FIG. 1C shows a closeup view of a user interface of the example MMOOD of FIG. 1A. In various embodiments, the closeup display 140 includes a fame or body 141 of the MMOOD device, image of wire 142, image of wooden stud 143, and image of metal rebar 144 displayed on screen 145. In various embodiments, additional symbols or markers 146, 147, and 148 may supply additional information about the images 142-144, such as the boundaries and centers of the images, respectively. In some embodiments, a status line in some designated area of the screen 145 to provide additional information and/or command soft buttons related to the operation of the MMOOD. These additional information and/or command soft buttons may be in the form touch-sensitive icons or fields that show or set (as a command) Deep Scan mode 149, Metal detection mode 150, Stud detection mode 151, Electrical wire detection mode 152, and battery status 153.

In various embodiments, screen 145 displays information about the results of scan, MMOOD configuration and modes, status of various functions, and the like. The status line having information icons or fields 149-153 may be context sensitive and the fields 149-153 may change and display different information depending on the scan mode or other operational mode of the MMOOD set by the user or preset at the factory. The changes in the fields may be color of the fields, size or font of the text, flashing to get user's attention, and the like. Depending on the context or setup of the MMOOD, the number of the fields 149-153 may also increase or decrease to show less or more information, respectively. In some embodiments, the visual information on the screen 145 may be supplemented by sound signals, such as beep sequences, from the MMOOD. The sound signals may allow the user to not look at the screen to see the status of the MMOOD device, hence, giving the user more independence and options to operate the device.

In some embodiments, the markers 146-148 mark the boundaries of the hidden objects to make it quicker and easier for the user to find the extent and boundaries of the object rather than estimating them. Those skilled in the art will appreciate that different types of markers may be used to provide additional information about object locations, positions, boundaries and the like. In some embodiments, the markers 146-148 may be displayed with different colors to be easily detected and differentiated by the user. For example, the center marker 148 may be in green color, while the corner markers 146 and 147 may be in red.

Figure 1D:
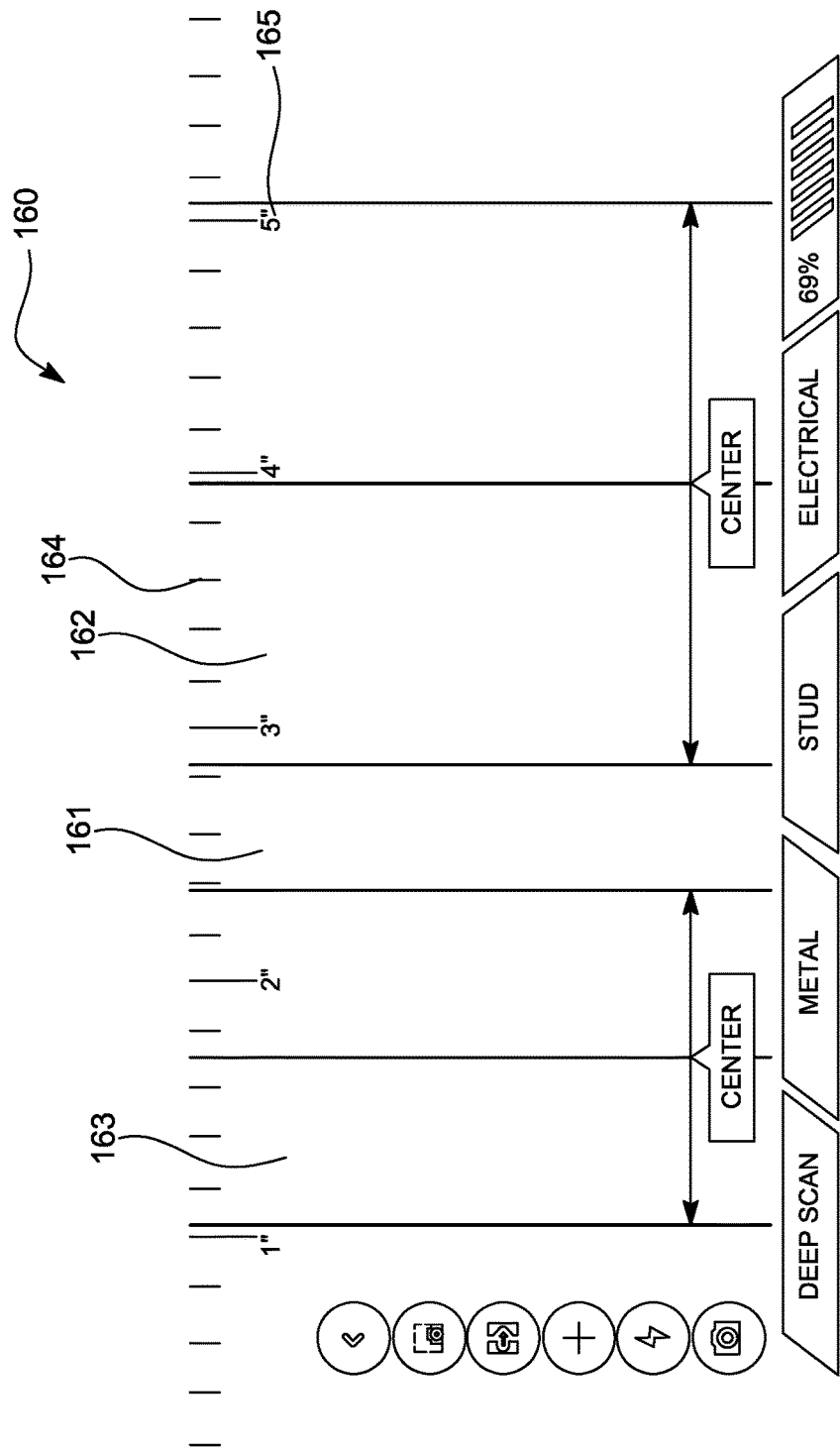
FIG. 1D shows another closeup view of the suer interface of the example MMOOD of FIG. 1A.

FIG. 1D shows another closeup view of the suer interface of the example MMOOD of FIG. 1A. In various embodiments, the closeup display 160 includes a screen 161, an image of wooden studs 162 and 163, scale marks 164 and numerical values 165.

In various embodiments, the information provided by the closeup display 160 may be in addition to the information shown with respect to FIG. 1C, described above. The scale marks 164 and the numerical values 165 provide additional information about the dimensions of the hidden objects to allow the user to accurately ascertain the size and position of various hidden objects with respect to each other.

Illustrative Computing Device Configuration

Figure 1E:
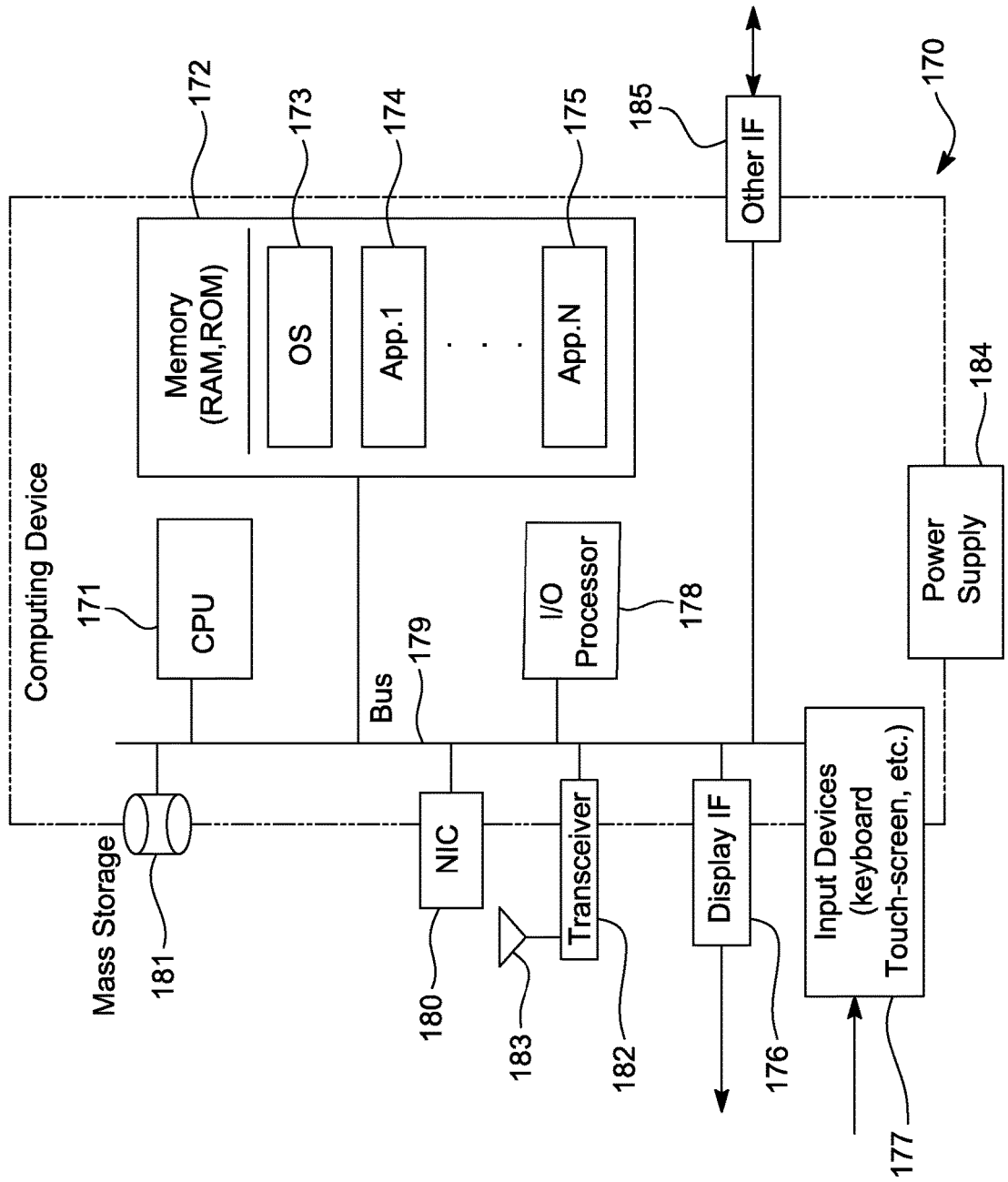
FIG. 1E shows an example computing device that may be used in the computing environment of FIG. 1A.

FIG. 1E shows an example computing device that may be used in the computing environment of FIG. 1A. FIG. 1E shows an illustrative computing device 170 that may represent any type of mobile, desktop, or server computer or embedded microcontroller. A computing device represented by computing device 170 may include less or more than all the components shown in FIG. 1E depending on the functionality needed. For example, a mobile computing device may include the transceiver 182 and antenna 183, while a server computing device may not include these components. Those skilled in the art will appreciate that the scope of integration of components of computing device 170 may be different from what is shown. As such, some of the components of computing device 170 shown in FIG. 1E may be integrated together as one unit. For example, Network Interface Card (NIC) 180 and transceiver 182 may be implemented as an integrated unit. Additionally, different functions of a single component may be separated and implemented across several components instead. For example, different functions of I/O processor 178 may be separated into two or more processing units.

With continued reference to FIG. 1E, computing device 170 includes mass storage 181, Central Processing Unit (CPU) 171, memory module 172, display interface 185, input devices 177, Input/Output (I/O) processor 178, bus 179, various other interfaces 185, NIC 180, power supply 184, transceiver 182, and antenna 183, all interconnected for electronic communication via data and/or control and/or address bus 179, Memory module 172 may include software such as Operating System (OS) 173, and a variety of software application programs and/or software modules/components 174-175. Such software modules and components may be stand-alone application software or be components, such as DLL (Dynamic Link Library) of a bigger application software. Computing device 170 may also include other components not shown in FIG. 1E. For example, computing device 170 may further include an illuminator (for example, a light), graphic interface, and portable storage media such as USB drives. Computing device 170 may also include other processing units, such as a math co-processor, graphics processor/accelerator, and a Digital Signal Processor (DSP).

Mass storage device 181 may include magnetic disks, magnetic tapes, optical drives for using optical media, such as CD (Compact Disc), DVD (Digital Video Disc), and the like. Mass storage devices 181 may provide large data and software storage as well inexpensive ways for storing information for archival and/or distribution purposes. In various embodiments, mass storage 181 may be a hard disk having a Ferro-magnetic stack of one or more disks forming a disk drive embedded in or coupled to computing device 170. A hard disk may be implemented as a solid-state device configured to behave as a disk drive, such as a flash-based hard drive. The mass storage device 181 may be a remote storage accessible over network interface 180 or another interface 185, but acting as a local hard drive. Those skilled in the art will appreciate that other technologies and configurations may be used to present a hard drive interface and functionality to computing device 170 without departing from the spirit of the present disclosure. In some embodiments, the mass storage devices may include USB (Universal Serial Bus) drives that may be implemented by PCM (Phase Change Memory) arrays, flash memory including NOR and NAND flash, pluggable hard drive, and the like.

Central Processing Unit (CPU) 171 may be the main processor for software program execution in computing device 170. CPU 171 may represent one or more processing units that obtain software instructions from memory module 172 and execute such instructions to carry out computations and/or transfer data between various sources and destinations of data, such as mass storage devices 181, I/O processor 178, display interface 176, input devices 177, and the like.

Memory module 172 may include RAM (Random Access Memory), ROM (Read Only Memory), and other storage means, mapped to one addressable memory space. Memory module 106 illustrates one of many types of computer storage media for storage of information such as computer readable instructions, data structures, program modules or other data. Memory module 172 may store a Basic Input/Output System (BIOS) for controlling low-level operation of computing device 170. Memory module 172 may also store OS 173 for controlling the general operation of computing device 170. The OS 173 may include a general-purpose operating system such as a version of UNIX, or LINUX™, or a specialized client-side and/or mobile communication operating system such as Windows Mobile™, Android®, or the Symbian® operating system.

Memory module 106 may further include one or more distinct areas (by address space and/or other means), which can be utilized by computing device 170 to store, among other things, applications and/or other data. For example, one area of memory module 172 may be set aside and employed to store information that describes various capabilities of computing device 170, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Display interface 176 may be coupled with a display unit (not shown), such as liquid crystal display (LCD), gas plasma, light emitting diode (LED), or any other type of display unit that may be used with computing device 100. Display units coupled with display interface 176 may also include a touch sensitive screen arranged to receive input from an object such as a stylus or a digit from a human hand. Display interface 176 may further include interface for other visual status indicators, such Light Emitting Diodes (LED), light arrays, and the like. Display interface 176 may include both hardware and software components. For example, display interface 176 may include a graphic accelerator for rendering graphic-intensive outputs on the display unit. In one embodiment, display interface 176 may include software and/or firmware components that work in conjunction with CPU 171 to render graphic output on the display unit.

Input devices 177 may include a variety of device types arranged to receive input from a user, such as a keyboard, a keypad, a mouse, a touchpad, a touch-screen (described with respect to display interface 176), a multi-touch screen, a microphone for spoken command input (for use with an audio interface), and the like.

I/O processor 178 is generally employed to handle transactions and communications with peripheral devices such as mass storage, network, input devices, display, and the like, which couple computing device 170 with the external world. In small, low power computing devices, such as some mobile devices, functions of the I/O processor 178 may be integrated with CPU 171 to reduce hardware cost and complexity. In one embodiment, I/O processor 178 may the primary software interface with all other device and/or hardware interfaces, such as mass storage 181, other interfaces 185, display interface 176, and input devices 177.

An electrical bus 179 internal to computing device 170 may be used to couple various other hardware components, such as CPU 171, memory module 172, I/O processor 178, and the like, to each other for internally specifying memory and register addresses for transferring data, instructions, status, and other similar information to the specified addresses.

Various other interfaces 185 may include other electrical and/or optical interfaces for connecting to various hardware peripheral devices and networks, such as speakers and microphones for audio interface, GPS (Global Positioning System), IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

NIC 180 may include circuitry for coupling computing device 100 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Power supply 184 provides power to computing device 170. A rechargeable or non-rechargeable battery may be used to provide power. The power may also be provided by an external power source, such as an AC adapter or a powered docking cradle that supplements and/or recharges a battery.

Transceiver 182 generally represents transmitter/receiver circuits for wired and/or wireless transmission and receipt of electronic data. Transceiver 182 may be a stand-alone module or be integrated with other modules, such as NIC 180, GPS hardware that may be part of the computing device. Transceiver 182 may be coupled with one or more antennas for wireless transmission of information.

Antenna 183 is generally used for wireless transmission of information, for example, in conjunction with transceiver 182, NIC 180, and a GPS unit of the computing device. Antenna 183 may represent one or more different antennas that may be coupled with different devices and tuned to different carrier frequencies configured to communicate using corresponding protocols and/or networks. Antenna 183 may be of various types, such as omni-directional, dipole, slot, helical, and the like.

FIG. 2 shows an example layout of multiple sensors of the MMOOD of FIG. 1A. In various embodiments, the sensor layout 200 includes capacitive sensors 201 arranged in a grid or array 202, and metal detector or sensor 204.

In various embodiments, the placement of various sensor types is as shown in FIG. 2. The capacitive sensor array 202 may contain a number of rows and columns, for example four rows and eight columns, as depicted in the example shown in FIG. 2. Each cell or capacitive sensor 201 may have dimensions on the order of a few millimeters each, for example 20 mm×20 mm.

In some embodiments, the two-dimensional capacitive sensor array 202 may be used to scan the wall in two dimensions or along two axes. The result of scanning is finding the objects behind the wall and visualization of their location and contours. Wooden objects or any non-metal stud will be visualized on screen. The accuracy of contours and dimensions of the sensed object depends on the physical dimension of each sensor. The capacitive sensor array 202 allows sensing of objects which have an angular orientation with respect to the wall plane. The depth of detection may be a few inches, such as 1.50 inches or more.

In some embodiments, the MMOOD device may also include AC wire sensor and metal detector 204. In some embodiments, the AC wire sensor, which may use information from the capacitive sensor array 202 to detect AC activity, may be active at all times during scanning to sound an alarm if an AC line is detected behind the wall. The metal detector 204 may be placed in the middle of the sensors layout 200 on the different sides (for example, on top and bottom, in FIG. 2) of the capacitive sensor array 202. This layout allows better and more predictable placement of sensors during scanning with respect to hidden objects and their locations.

Figure 3:
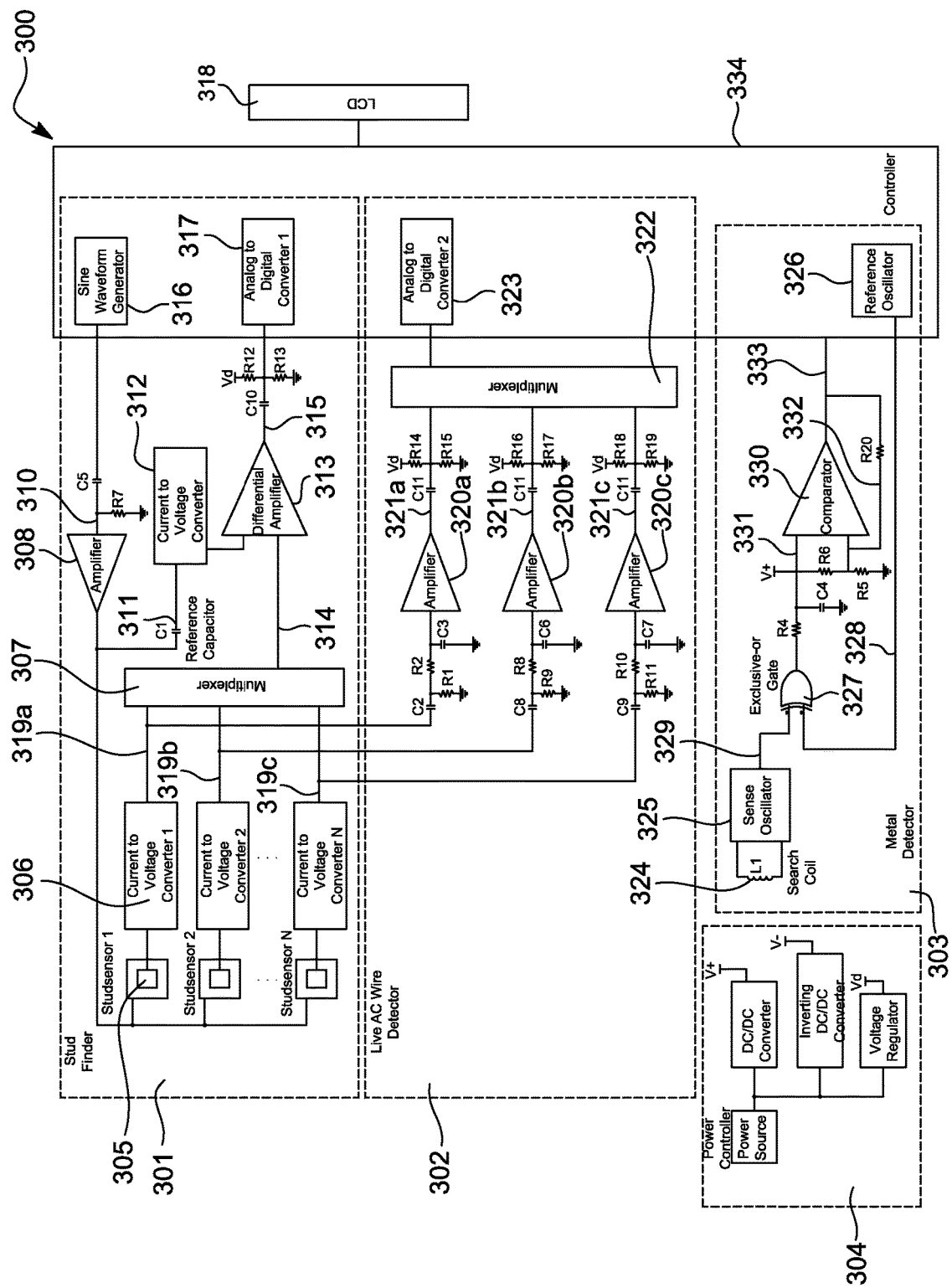
FIG. 3 shows an example multi-sensor circuit diagram of the MMOOD of FIG. 1A.

FIG. 3 shows an example multi-sensor circuit diagram of the MMOOD of FIG. 1A. In various embodiments, multi-sensor circuit 300 includes wooden stud finder circuit 301, which includes one or more capacitive sensors 305, each coupled with a current-voltage-converter 306, which in turn are coupled with a first multiplexer 307. Outputs 319a, 319b, and 319c of the current-voltage-converters 306 are also coupled with inputs of amplifiers 320a, 320b, and 320c, respectively, of an AC wire detector circuit 302. The first multiplexer 307 is coupled with an input of a differential amplifier 313 with output 315 coupled with a first analog-to-digital converter (ADC) 317 in a controller unit 334 coupled with an LCD (Liquid Crystal Display) 318. A signal generator, such as a sine waveform generator 316 is coupled with a first signal amplifier 308 via its input 310, the output 309 of which is coupled with the capacitive sensors 305. The output 309 of the first signal amplifier 308 is further coupled with an input 311 of a current-to-voltage converter 312, which in turn is coupled with another input of the differential amplifier 313.

The multi-sensor circuit 300 may further include the AC wire detector circuit 302 receiving inputs 319a-319c from capacitive sensors 305 at the inputs of amplifiers 3206a-320c, having outputs 321a, 321b, and 321c, which are coupled with a second multiplexer 322, in turn coupled with a second ADC 323 on the controller unit 334.

The multi-sensor circuit 300 may further include a metal detector circuit 303 including a detection coil 324 coupled with one input 329 of an XOR (Exclusive OR logic gate) gate 327, the other input 328 of which is coupled with a reference oscillator 326 deployed on the controller unit 334. The output of the XOR gate 327 is coupled to one input 331 of a comparator 330. The other input 332 of the comparator 330 is coupled to electrical ground via a resistor network. The output 333 of the comparator 330 is coupled with the controller unit 334.

In various embodiments, in operation, when the scan modes of the MMOOD device are set by the user or preset from factory to scan for objects made from electrically non-conductive or dielectric material, such as wood, then once the scan is activated by the user, the sine waveform generator 316 starts generating a sinusoidal signal that is transmitted to the first signal amplifier 308 to boost the strength and amplitude of the signal. The amplified signal is then transmitted to the capacitive sensors 305. Due to the time-varying signal (sine wave or other variable signals), an electric field is setup in the vicinity of the sensor. When another dielectric object, such as a hidden wooden object, comes in close proximity of the capacitive sensor beyond a certain distance threshold, which depends on the dimensions of the capacitive sensor, magnitude of signal current and other factors, the electric field is disturbed and changes. This change in the electric field is interpreted as being caused by a hidden dielectric object in close proximity. And hence, the wooden stud or other dielectric object is detected. The output of each capacitive sensor 305 is converted to a voltage via the current-to-voltage converter 306, which is then transmitted the differential amplifier 314. The first multiplexer 307 is used to selectively direct the output of a particular capacitive sensor 305 in the capacitive sensor array 202 (see FIG. 2) to the differential amplifier 313.

In some embodiments, the capacitive sensor, also known as capacitive proximity sensors, may sense the presence of other types of material, such as metallic objects, without being able to identify the type of material. In such cases, the capacitive sensor array is useful in detecting the boundaries of the object, whether the material the object is made of is electrically conductive or non-conductive. This property of capacitive sensors is useful in combination with other types of sensors to detect both the shape or boundaries of an object as well as the material the object is made of. For example, the capacitive sensor may detect the existence and shape of a rebar, while the metal detector (sensor) identifies it as a metal object.

With continued reference to FIG. 3, the differential amplifier 313 has two inputs that are compared. One input comes from the sine waveform generator 316 via the first amplifier 308 to a reference capacitor, similar to the capacitive sensors 305, after conversion to a voltage via the current-to-voltage converter 312. The other input 314 comes from the output of the capacitive sensors 305 after passing through the current-to-voltage converters 306. Hence, both inputs to the comparator 313 are of equivalent type and will present similar signals when there is no disturbance in the electric field of the capacitive sensors 305. However, when there is interference in the electric field of the capacitive sensors 305 due to proximity of a dielectric material, then the signal presented to input 314 will be different from the signal presented by the reference capacitor via the current-to-voltage converter 312. The differential amplifier 313 amplifies this difference between its two inputs and presents to the output signal 315 to the first ADC 317 on controller unit 334 to show results on the LCD 318. The output of the differential amplifier 313 indicates which of its inputs is relatively larger. In this application, the differential amplifier 313 generally operates in the linear active region. In this region, if the inverting input is larger, then the output 315 will show a negative value. If the non-inverting input is larger, then the output 315 will show a positive value.

In various embodiments, in operation, when the scan modes of the MMOOD device are set by the user or preset from factory to scan for AC wires, while in other embodiments, a user may select the scan mode. When active, the AC wire detector circuit 302 will react to any time-varying signal that may be generated in a conductor (example, AC wire) within a certain distance threshold from the capacitive sensors 305, the outputs of which are converted to voltage by the current-to-voltage converters 306, and then passed on to the amplifiers 320a-320c, respectively, via an RC (Resistor-Capacitor) filter network that are tuned to detect AC frequencies, such as frequencies in the range of 45 Hertz (HZ) to 65 HZ, or other appropriate ranges.

For example, a wire behind a wall that carries an AC current may disturb the electromagnetic field around the capacitive sensors 305 according the frequency of the AC current. The signal so generated passes though the RC filter, which only allows the predetermined range of frequencies to pass through and reach the inputs of the amplifiers 320a-320c. The second amplifiers 320a-320c in turn amplify the AC signals so detected and pass it onto the second multiplexer 322. The inputs to the second multiplexer 322 may be selected by the controller unit 334 to pass through the output of the second multiplexer 322 one of the several signals output by the amplifiers 320a-320c to the second ADC 323 on controller unit 334 for displaying results on LCD 318. Hence, the AC wire detector or sensor is a combination of AC wire sensor circuit 302 and parts of the stud finder circuit 301.

The selected outputs of the amplifiers 320a-320c correspond to the capacitive sensors 305, respectively, and the points on the wall that are being scanned by the capacitive sensors 305. So, by selecting the inputs to the second multiplexer 322, the controller may display the contour of the AC wire behind the scanned wall. Each portion of the AC wire may be adjacent to a one or more of the capacitive sensors 305 in the capacitive sensor array 202. Thus, by selecting the outputs corresponding to each capacitive sensor in the array in order and displaying the results, the controller unit 334 may in effect trace the contour of the AC wire stretched across points behind the wall. This is because each capacitive sensor that detects a part of the AC wire will eventually be shown on the LCD 318 and the collection of such detected or active points results in the positional image of the AC wire on the LCD 318.

In some embodiments, the MMOOD device may have an AC sensor, which can detect the existence of an AC wire using the capacitive sensors 305 as described above and further described later with respect to FIG. 5. For visualization of AC wire contour, the capacitive sensors in the array work in parallel with the AC sensor. The capacitive sensors will detect the AC wire as an object (not an AC wire) such as a stud, and by moving the MMOOD device over the wall surface. When the hidden AC wire is detected by the AC wire sensor 203, the AC wire is identified as an AC wire. After detecting the AC wire, the image which was shown as a result of object detection by the capacitive sensors, will be changed to show an image of the AC wires. The graphical representation of AC wire is shown in FIGS. 1A-1C. The depth of detection may be a few inches, such as 1.5 inches or more.

With continued reference to FIG. 3, in various embodiments, in operation, when the scan modes of the MMOOD device are set by the user or preset from factory to scan for metal objects, such as rebars, once the scan is activated by the user, the detection coil 324 may be used to sense proximity of metallic objects around it. The detection coil 324 is an inductor which when carrying a variable current will generate a magnetic field around its inductor core. The sense oscillator 325 generates the variable current for the detection coil 324. A reference oscillator 326 generates the same variable current as the sense oscillator 325. If a metallic object comes in proximity of the detection coil 324, the magnetic field around the coil is disturbed and changed and the current through it will also change. When the output of sense oscillator and reference oscillator that are input to the XOR gate 327 via inputs 329 and 328, respectively, the output of the XOR gate 327 will be active (or ON) only if the two inputs are different. The output of the XOR gate 327 is coupled with the input 331 of the comparator 330. The other input 332 of the comparator 330 is tied to a resistive voltage divider, or other fixed voltage reference. When the inputs 331 and 332 different, the output 333 of the comparator 330 signifies this difference and presents it to the controller 334 for display on LCD 318.

In various embodiments, the MMOOD device may have a single metal sensor in the form of a detection coil 324, which may be located at one side, for example, bottom side of the capacitive sensor array 202 (see FIG. 2). The metal detector can identify the existence of a metal object, but not the type of metal, such as steel or copper. As in capacitive sensor scanning, the AC sensor is generally turned on to alert the user against live AC wire when scanning for metal objects. Since metal detector can also detect wiring, which is made of metal, AC sensor can be used in conjunction with the metal detector to distinguish AC wire from other metal objects such as rebar. Similar to AC wire detection, the metal detector can identify the existence of a metal object, but it cannot detect the contour of the object. Because of this, capacitive sensors may be used to detect the contours of the object. Metal detection may be done the same way as AC wire detection described above. When the MMOOD device displays the result of capacitive sensor scanning as an object's contours, as the user moves the device over the target surface, such as a wall, the hidden object may come in the proximity of the metal detector. At this point, the image shown on the display may be changed to show the metal object. The graphical representation of sensed metal is shown in FIG. 1A-1C. The depth of scan for detection is typically a few inches, such as 1.5 inches or more.

In various embodiments, the controller unit 334 receives scan data from the sensors, including the capacitive sensors, the AC wire sensor, and the metal detector. The scan data are the information collected via the sensors in the form of electrical signals, which may be amplified, filtered, digitized, or otherwise processed or conditioned by the respective circuits for each sensor type. Generally, each of the sensors generates some form of an electrical signal, which is subsequently processed by the respective circuits for the sensors. The controller unit 334 may include a digital processor or microcontroller (not shown in FIG. 3), similar to the CPU 171 of FIG. 1E, and program memory that holds operating system and application software for the MMOOD. Alternatively, controller unit 334 may have hardware circuits that perform non-programmable fixed operations on the scan data for display. The controller unit 334 converts the conditioned and digitized scan data it received from sensor circuits, and processes the data to generate image data for display on the LCD screen 318.

In various embodiments, a power controller 304 may be employed to supply the power needed for various components such as op-amps (operational amplifier), controller, oscillators, wave generator, and the like.

Figure 4A:
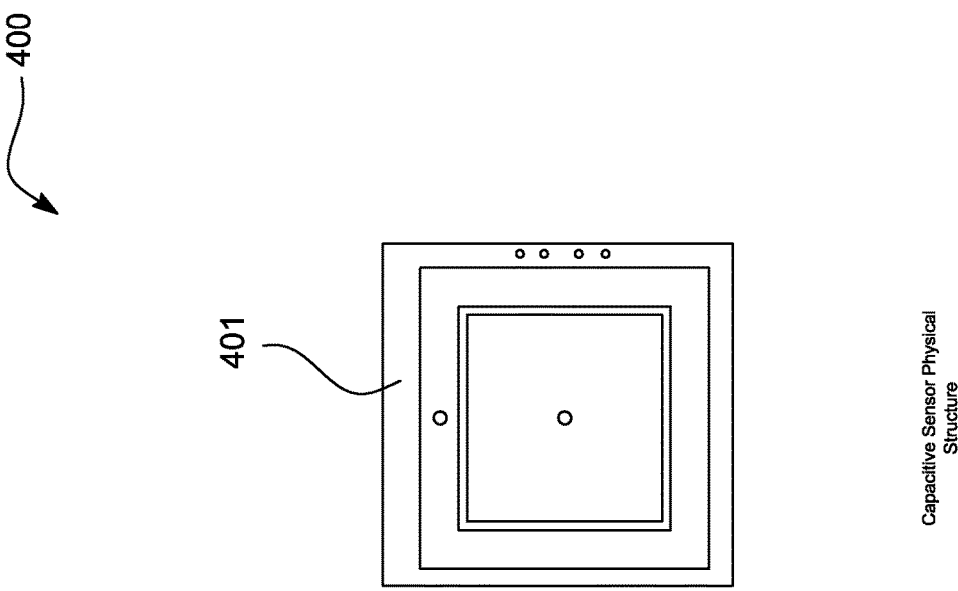
FIG. 4A shows an example physical structure of a capacitive sensor.

FIG. 4A shows an example physical structure of a capacitive sensor. In various embodiments, the physical arrangement of capacitive sensor circuit 400 includes capacitive sensor 401 divided into a top plate 402, bottom plate 403 (opposite side of top plate 402), dielectric layer 401a, output 404 from signal generator 316 and amplifier 308, and output 405 from capacitive sensor 401 to current-to-voltage converter. The electrical characteristics and operation of the capacitive sensor circuit is further described below with respect to FIG. 4B.

Figure 4B:
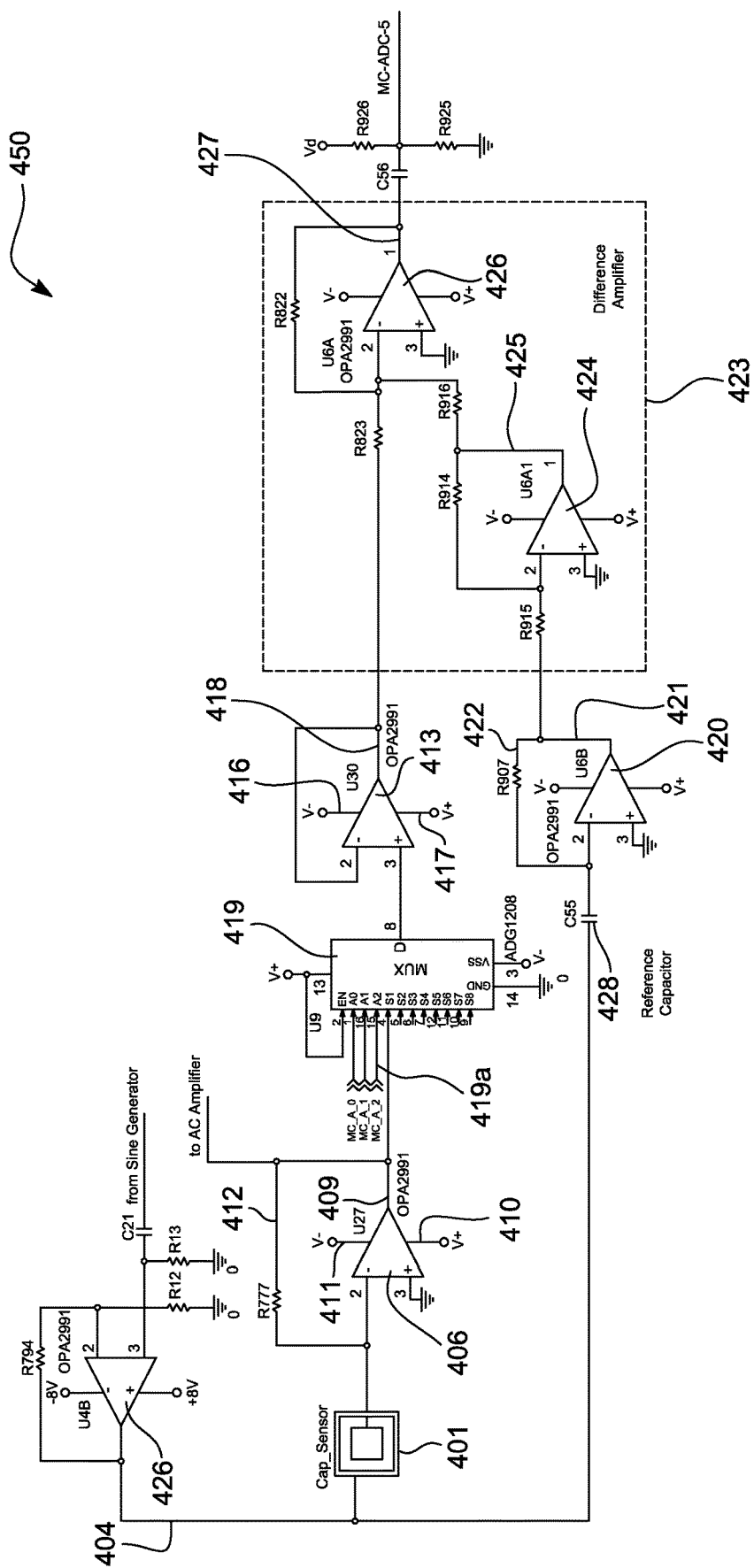
FIG. 4B shows an example capacitive sensor circuit diagram of the MMOOD of FIG. 1A.

FIG. 4B shows an example capacitive sensor circuit diagram of the MMOOD of FIG. 1A. In various embodiments, capacitive sensor circuit 450 shows more details about block 301 described above with respect to FIG. 3, and includes capacitive sensor 401 coupled with the signal amplifier 308 via output 404, a current-to-voltage converter op-amp 406 having inverting and non-inverting inputs, voltage rails (supply voltages to op-amp, +/−Vcc) 410 and 411, and output 409. A negative feedback network 412 including an RC (Resistor-Capacitor) circuit connects output 409 to the inverting input of current-to-voltage converter op-amp 406. The output 409 of current-to-voltage op-amp 406 is coupled with an input of a multiplexer 419 having multiple inputs and input selection lines or pins 419a. The multiplexer 419 has an output coupled with a non-inverting input of a signal amplifier (buffer) 413 having Vcc inputs 416 and 417 and output 418. The output 418 of the signal amplifier 413 is coupled with a difference amplifier block 423, which includes an inverter 424 and a summing amplifier 426. The output 418 of the signal amplifier 413 is coupled to an inverting input of the summing amplifier 426 of the difference amplifier 423. The non-inverting input of summing amplifier 426 is electrically grounded. Output 404 from signal amplifier 308 is also coupled with a reference capacitor 428, which is in turn coupled with an inverting input of a current-to-voltage converter 420 having an output 421 coupled with the difference amplifier block 423, and a feedback loop 422. Output 421 is coupled with the inverting input of inverter 424 to produce an inverted signal at output 425 of inverter 424. Output 425 is coupled with the inverting input of summing amplifier 426. An output 427 of summing amplifier 427 is in turn coupled with the first ADC 317.

The operation of the circuit is similar to that described above with respect to FIG. 3. In more detail, the signal generator 316 generates a sine wave signal that passes through signal amplifier 308 and passed on to the capacitive sensor 401 and reference capacitor 428 simultaneously. The sine wave signal causes a magnetic field to form around each one of the capacitors. When the capacitive sensor 401's electric field is disturbed due to a dielectric object, such as a wood stud, coming in close proximity during scanning, a signal is generated by the capacitive sensor 401 that is different from the signal based on undisturbed electric field generated due to the sine wave signal alone.

In this arrangement, two parallel signal paths, one originating from the capacitive sensor 401 and the other one originating from the reference capacitor 428. The two parallel signals are eventually coupled with the difference block 423 to be compared. For each one of the capacitive sensors 401 in capacitive sensor array 202, the first signal path passes through current-to-voltage converter 406, and then passes through one input of multiplexer 419, which if selected by controller unit 334 using input selection lines 419a, passes on to signal amplifier 413 and then on to inverting input of summing amplifier 426. The second signal path starts with reference capacitor 428 and is shared by all capacitive sensors in the capacitive sensor array 202, and passes through current-to-voltage converter 420 and then to inverter 424 to be inverted and coupled with the inverting input of summing amplifier 426. If the two input signals to summing amplifier 426 from output 418 and 425 are the same, which occurs when the magnetic field of capacitive sensors 401 are not disturbed by a proximate object behind the wall (for example, a wooden stud), then because the signal carried by output 425 is the inverse of the signal carried by output 418, their sum is approximately zero or very close to zero. In this case, the output 427 of summing amplifier 426 will also be close to zero or considered to be inactive, indicating that no object has been detected by capacitive sensor 401. If the two input signals, however, are different, then their sum will also be non-zero and the output of summing amplifier 426 will also be nonzero or considered to be active, indicating that an object has been detected by capacitive sensor 401. The output signal of summing amplifier 426 is coupled to second ADC 323 and subsequently to the controller unit 334 (see FIG. 3).

Figure 5:
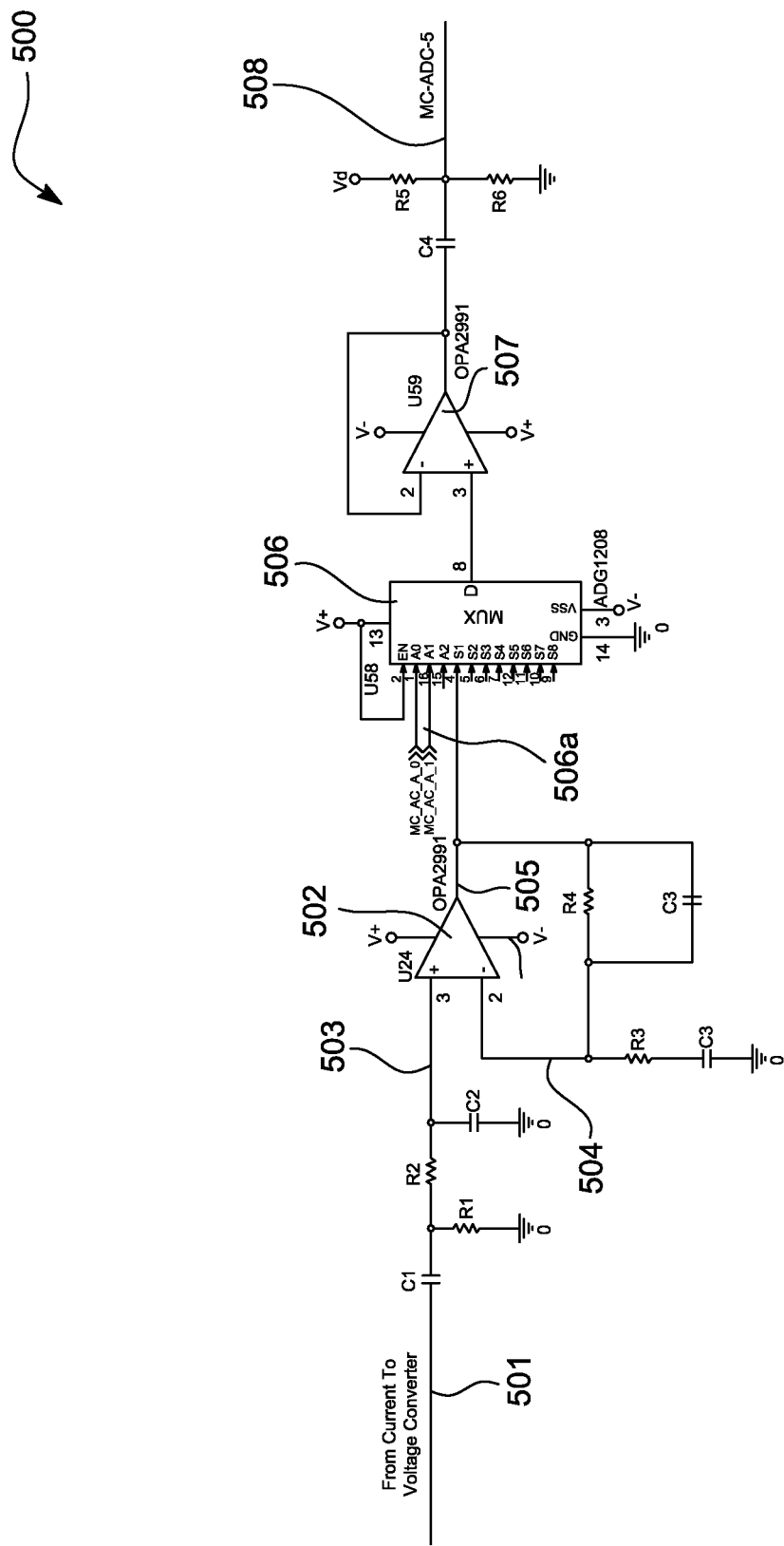
FIG. 5 shows an example AC (Alternating Current) sensor circuit diagram of the MMOOD of FIG. 1A.

FIG. 5 shows an example AC (Alternating Current) sensor circuit diagram of the MMOOD of FIG. 1A. In various embodiments, AC sensor circuit 500 shows more details about block 302 described above with respect to FIG. 3, and includes output 501 from current-to-voltage converters 319a-319c (see FIG. 3) coupled to the non-inverting input 503 of amplifier 502 with output 505. The inverting input 504 of amplifier 502 is coupled to the output 505 via an RC feedback loop. The output 505 of amplifier 502 is coupled with a multiplexer 506 (similar to multiplexer 322 of FIG. 3) having input selection lines 506a and an output that is coupled with op-amp 507, a buffer, the output of which is coupled with second ADC 323 on controller unit 334 of FIG. 3.

The operation of the circuit is similar to that described above with respect to FIG. 3. In more detail, and with reference to FIGS. 3 and 4B, when an AC wire is scanned behind a wall by capacitive sensors 401 in sensor array 202, if a varying current with a particular frequency, such as 60 HZ, is passing through the AC wire, the varying current will disturb the magnetic field created around the capacitive sensors 401 caused by the sine wave signal in output 404. The disturbance is passed on through outputs 319a-319c to the RC filter between output 501 and input 503. This filter allows a time-varying disturbance signal to pass through an inline capacitor (C1) to amplifier 502 while blocking constant signals. This way, a variable signal in an active AC wire creates a variable disturbance signal, which passes on to an input of multiplexer 506, and if that input is selected by controller unit 334 using input selection lines 506a, the variable disturbance signal is transmitted to controller unit 334 via output 508 and is interpreted as a detected AC wire.

Figure 6:
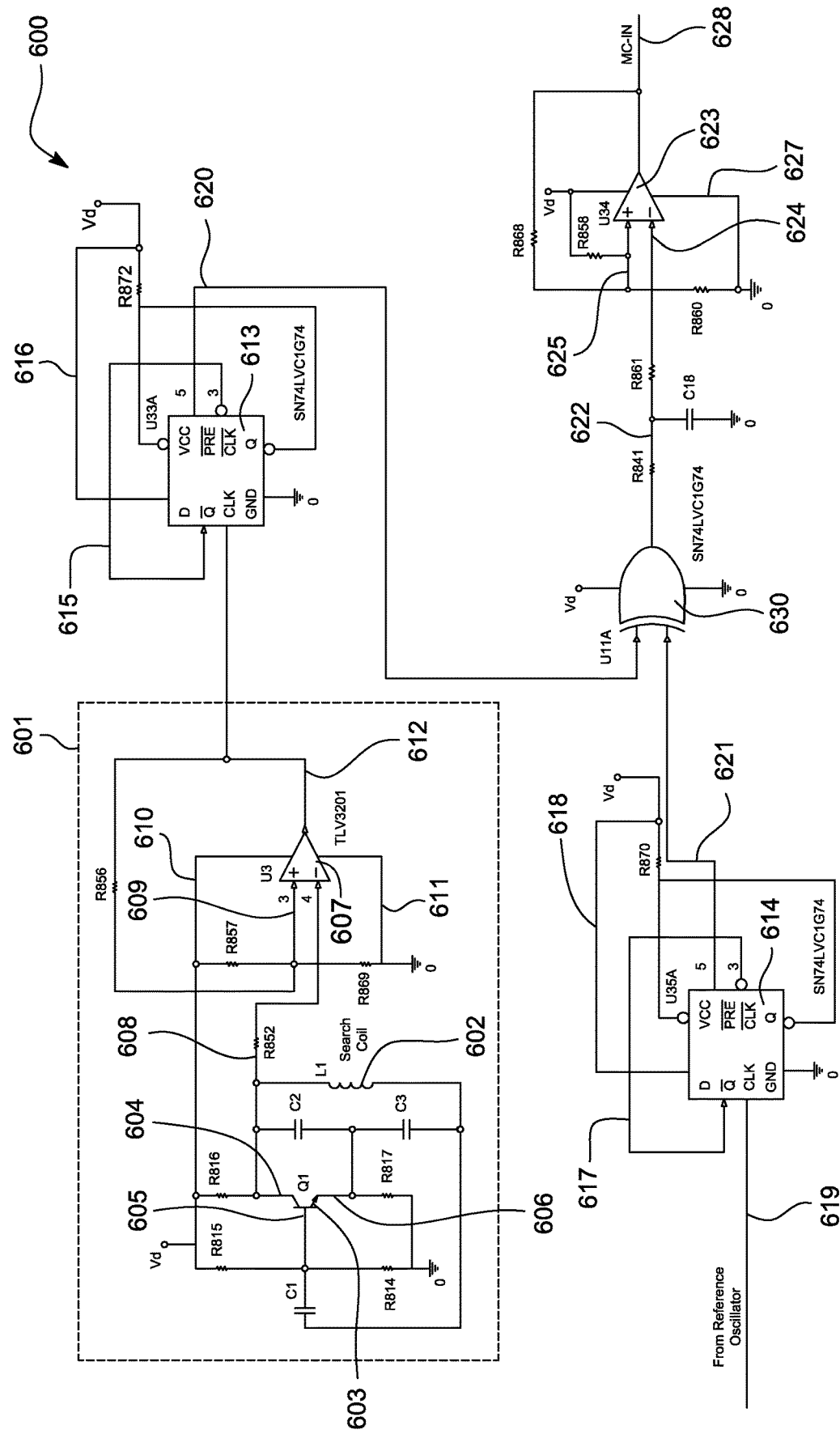
FIG. 6 shows an example metal detector circuit diagram of the MMOOD of FIG. 1A.

FIG. 6 shows an example metal detector circuit diagram of the MMOOD of FIG. 1A. In various embodiments, metal detector circuit 600 shows more details about block 303 described above with respect to FIG. 3, and includes a coil circuit block 601 including a transistor 603 with collector 604, emitter 606, and base 605. A detection coil 602 is coupled with the transistor 603 that acts as a sense oscillator for the detection coil 602. A reference oscillator 607 includes inputs 608 and 609 and rail voltages 610 and 611 and output 612. The coil circuit block 601 is in turn coupled with a clock (CLK) input of a first D-type flipflop 613 with signal input 615, power input 616, and output 620. A second D-type flipflop 614 has its clock (CLK) input 619 coupled to the output of coil circuit block 601. The other input 617 of flipflop 614 is coupled with an inverting clock pin of flipflop 614. The output 621 of flipflop 614 is coupled with one input an XOR (exclusive OR) logic gate 630, the other input of which is coupled to output 620 of flipflop 613. The output 622 of XOR logic gate 630 is coupled with the inverting input 624 of comparator 623 having non-inverting input 625 and voltage rails 626 and 627, and output 628.

The operation of the circuit is similar to that described above with respect to FIG. 3. Briefly, a sense oscillator sends a varying current through detection coil 602, which together with a reference oscillator 607 are input into an XOR gate. The output of the XOR logic gate 630 is compared with a reference voltage via comparator 623 to determine if the magnetic field around the detection coil 602 has been disturbed by proximity to a metallic object.

Figure 7:
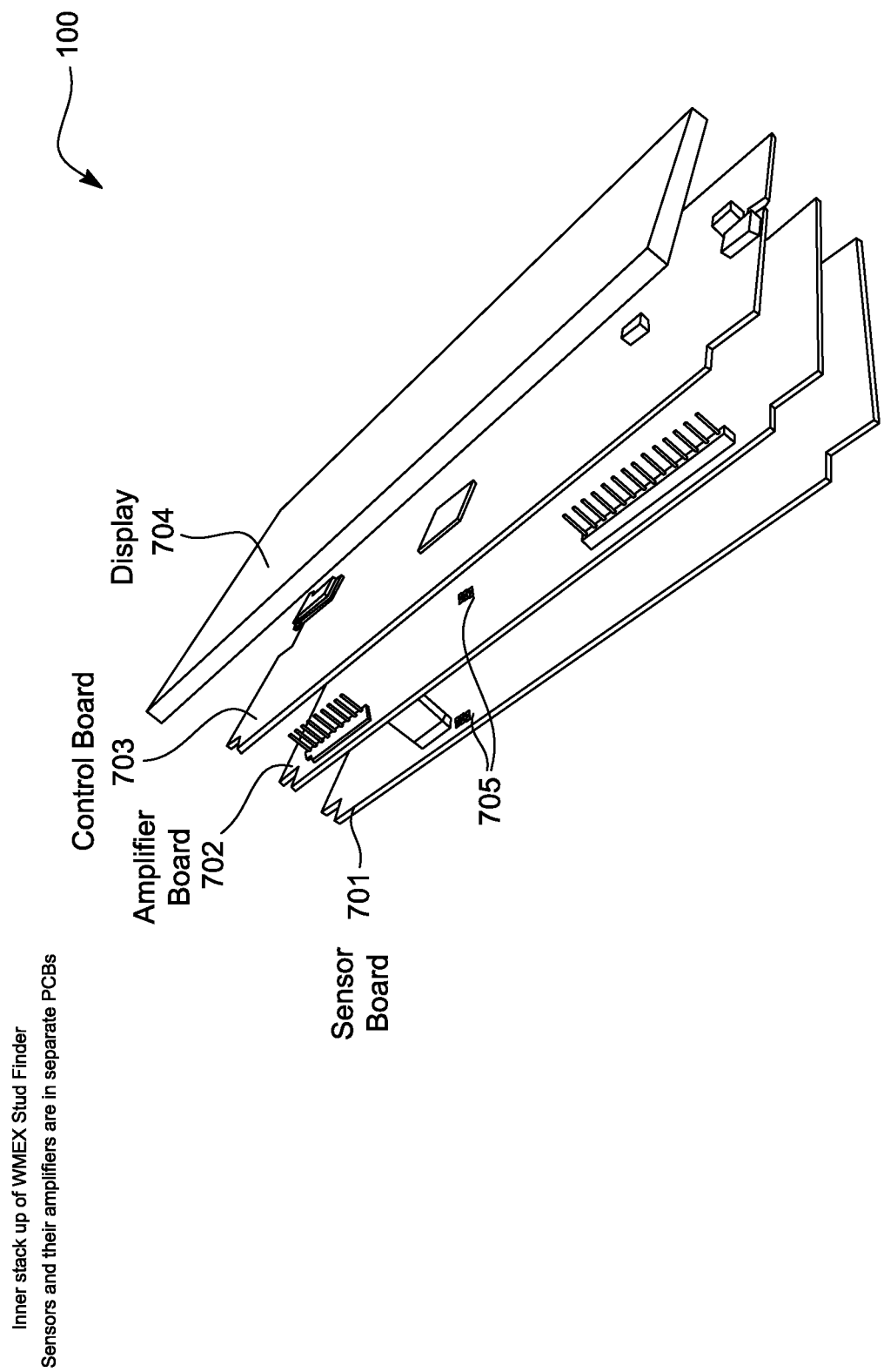
FIG. 7 shows an example PCB (Printed Circuit Board) assembly of the MMOOD of FIG. 1A having a separate PCB for sensors, amplifiers, controller, and display.

FIG. 7 shows an example PCB assembly of the MMOOD of FIG. 1A having a separate PCB for sensors, amplifiers, controller, and display. In various embodiments, the electronic components may be arranged in different ways. One arrangement is to divide sensors, amplifiers, control unit and display unit on different PCBs. In one embodiment, sensors are placed on sensor board 701, amplifiers are placed on an amplifier board 702, control unit components are placed on a control board 703 and LCD components are placed on a display panel 704. Each PCB may have additional electronic components 705 for various functions such as power distribution, noise filtering, and data buffering.

Figure 8:
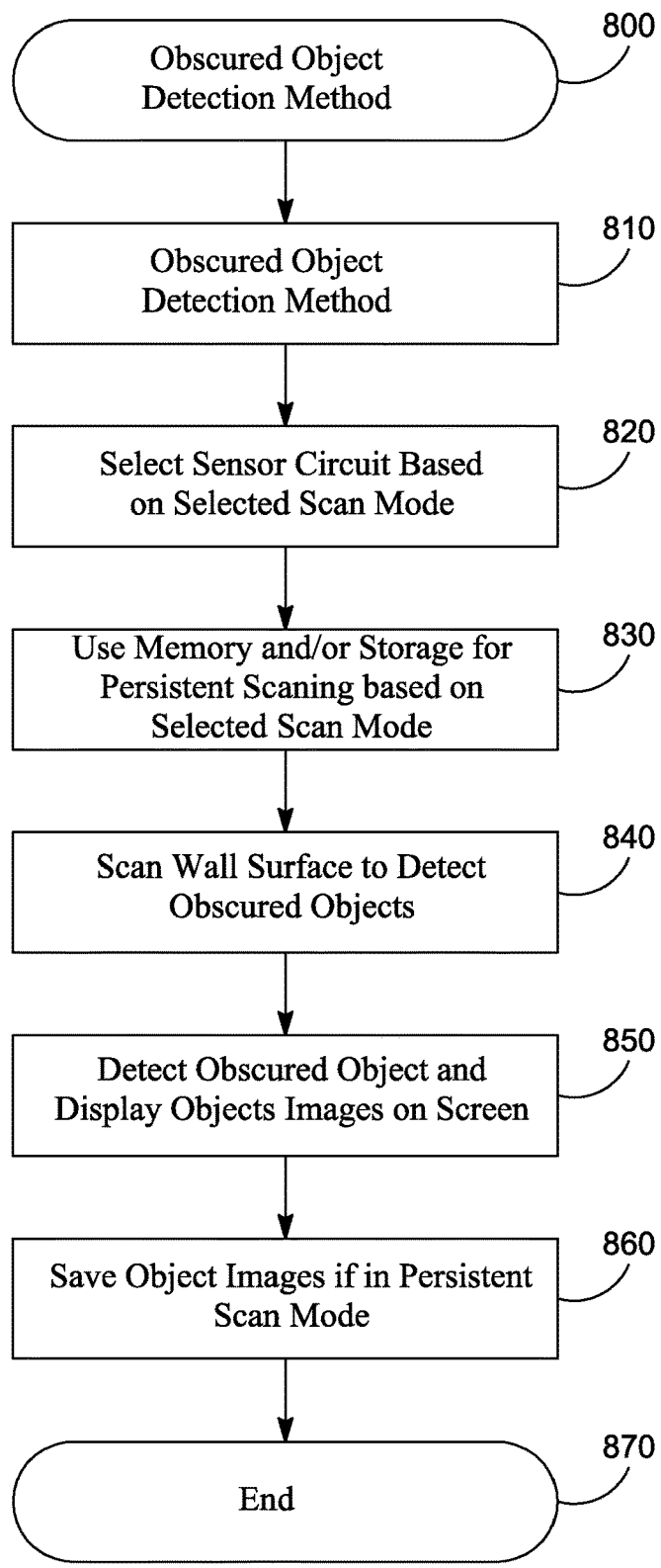
FIG. 8 shows an example flow diagram for a method of detecting obscured objects.

FIG. 8 shows an example flow diagram for a method of detecting obscured objects. In various embodiments, the obscured object detection method 800 proceeds to block 810.

At block 810, a scan mode is selected by the user. As described with respect to FIG. 1A above, several operational modes may be selected including scan modes based on type of objects to be detected, persistent scan modes in which images are recorded, deep-scan mode, auto-calibration mode, and combinations thereof. The process proceeds to block 820.

At block 820, a sensor type may be selected for scanning based on the scan mode selected. For example, if metal detection mode is selected in block 810, then metal detection sensors and circuits are activated while other sensor types and their respective circuits may remain inactive for the duration of the selected scan mode. The process proceeds to block 830.

At block 830, if the selected scan mode is persistent mode, then memory and/or storage may be employed to record scanned images. In some embodiments, persistent mode is used for continuous scan and/or project documentation. It may also be used examining an acquired scan image later after the scan. The process proceeds to block 840.

At block 840, the scan function of the MMOOD device is activated by the user to scan a target surface, such as a wall, to detect hidden objects behind the target surface. In some embodiments, the scan function may be activated by pressing and holding a scan button, or alternatively a toggle button may be pressed to start the scan and pressed again to stop it. The process proceeds to block 850.

At block 850, during scan, or after the scan when in persistent mode, the image may be displayed on an LCD screen of the MMOOD. The hidden object images are generally displayed in the position detected. The images may be symbolic or photo-similar to the object. Symbolic images may include standard icons or diagrammatic drawings for each type of hidden object. Photo-similar images may include accurate outline of the object and realistic texture and color for the type of object. For example, a wooden stud may be depicted with wood grain and in light brown or beige color. In some embodiments, additional information may be shown on the screen, such as marks showing the boundaries of the hidden objects or numerical measurements such as the width of the object. The process proceeds to block 860.

At block 860, if in persistent mode, the scanned images may be uploaded to a computer or other external storage for later examination, project documentation, or communication to others. The process proceeds to block 870.

At block 870, the process is terminated.

It will be understood that each step of the processes described above, and combinations of steps, may be implemented by computer program instructions. These program instructions may be provided to a processor to produce a machine, such that the instructions, which execute on the processor, enable implementing the actions specified. The computer program instructions may be executed by a processor to cause a series of operational steps to be performed by the processor to produce a computer implemented process such that the instructions, which execute on the processor to provide steps for implementing the actions. The computer program instructions may also cause at least some of the operational steps to be performed in parallel. Moreover, some of the steps may also be performed across more than one processor, such as might arise in a multi-processor computer system. In addition, one or more steps or combinations of steps described may also be performed concurrently with other steps or combinations of steps, or even in a different sequence than described without departing from the scope or spirit of the disclosure.

Accordingly, steps of processes or methods described support combinations of techniques for performing the specified actions, combinations of steps for performing the specified actions and program instruction for performing the specified actions. It will also be understood that each step, and combinations of steps described, can be implemented by special purpose hardware based systems which perform the specified actions or steps, or combinations of special purpose hardware and computer instructions.

It will be further understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A multi-mode obscured object detection (MMOOD) system for detecting objects hidden behind a surface, the system comprising:
   an electronic device with a digital screen;
   a plurality of sensor types and a plurality of sensor circuits to detect different types of objects and materials, each of the plurality of sensor circuits being different from other sensor circuits to detect a particular type of object and material;
   a scan actuator to start scanning a target surface having hidden objects behind the target surface and generating image data corresponding to the hidden objects; and
   a controller unit to receive the generated image data and render images of the hidden objects, including hidden objects two-dimensional contours and positions relative to other hidden objects, on the digital screen.

2. The system of claim 1, further comprising a memory module to store the generated image data.

3. The system of claim 1, further comprising a two-dimensional (2D) array of one type of sensor.

4. The system of claim 3, wherein the 2D array of one type of sensor comprises a 2D array of capacitive sensors usable to detect a 2D boundary or 2D shape of an object.

5. The system of claim 1, wherein the plurality of sensor types includes a capacitive sensor, an AC wire sensor, and a metal sensor.

6. The system of claim 5, wherein the capacitive sensor is coupled with a signal generator that is also coupled with a reference capacitor.

7. The system of claim 6, wherein the capacitive sensor is used to detect a dielectric material.

8. The system of claim 5, wherein the AC wire sensor uses the capacitive sensors to detect a variable current, and wherein the metal sensor comprises a single coil coupled with a sense oscillator.

9. A hidden object detector comprising:
   a digital screen;
   a plurality of sensors including an array of capacitive sensors, and at least one of an AC wire sensor, and a metal detector;
   a plurality of signal processing circuits, each being different from other signal processing circuits to detect a particular type of object and material;
   a scan actuator usable to scan a target surface, with hidden objects behind the target surface, to detect the hidden objects by collecting scan data; and
   controller unit to receive scan data and convert the scan data to two-dimensional image data, representing the hidden objects' relative positions, to display on the digital screen.

10. The hidden object detector of claim 9, further comprising a storage unit to store the image data.

11. The hidden object detector of claim 9, wherein each of the plurality of signal processing circuits is associated with a different type of the plurality of sensors.

12. The hidden object detector of claim 11, wherein a first one of the plurality of signal processing circuits is used to process signals generated by the capacitive sensors, the first one of the plurality of signal processing circuits comprising a current-to-voltage converter and a differential amplifier.

13. The hidden object detector of claim 9, wherein a second one of the plurality of signal processing circuits is used to process signals generated by the AC wire sensor, the second one of the plurality of signal processing circuits comprising a signal amplifier and an analog-to-digital converter.

14. The hidden object detector of claim 9, wherein a third one of the plurality of signal processing circuits is used to process signals generated by the metal sensors, the third one of the plurality of signal processing circuits comprising a single coil, a sense oscillator, and comparator.

15. A method of detecting obscured objects, the method comprising:
   activating a scan function on a multi-mode obscured object detector (MMOOD) to start scanning a target surface for hidden objects;

scanning the target surface to collect scan data using a plurality of sensor types;

conditioning the scan data using a plurality of circuits, each of the plurality of circuits associated with a particular type of sensor, and each of the plurality of sensor circuits being different from other sensor circuits to detect a particular type of object and material;

transmitting the conditioned scan data to a controller unit;

processing the conditioned scan data to convert them to image data by the controller unit; and displaying the image data by the controller unit on a digital screen, the image data being two-dimensional representation of the hidden objects including relative positions.

16. The method of claim 15, further comprising selecting a scan mode by a user of MMOOD.

17. The method of claim 16, wherein the plurality of sensor types includes capacitive sensors, an AC wire sensor, and a metal sensor.

18. The method of claim 15, wherein the conditioning of the scan data comprises amplification and comparison of the scan data.

19. The method of claim 15, wherein the processing the conditioned scan data comprises digitizing the scan data using an analog-to-digital convert.

20. The method of claim 15, wherein displaying the image data comprises displaying contours of the hidden objects and indicating the type of object.

* * * * *